(12) United States Patent
Delaney et al.

(10) Patent No.: US 7,127,057 B2
(45) Date of Patent: Oct. 24, 2006

(54) METHODS AND SYSTEMS FOR DISTRIBUTING APPLICATION DATA AMONG MULTIPLE PROCESSING MODULES IN A TELECOMMUNICATIONS NETWORK ELEMENT HAVING A DISTRIBUTED INTERNAL PROCESSING ARCHITECTURE

(75) Inventors: Robert J. Delaney, Raleigh, NC (US); Todd Eichler, Wake Forest, NC (US); Peter J. Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 10/703,385

(22) Filed: Nov. 7, 2003

(65) Prior Publication Data

US 2005/0101297 A1    May 12, 2005

(51) Int. Cl.
*G06F 17/30* (2006.01)
*H04M 3/42* (2006.01)
*H04M 7/00* (2006.01)
*H04Q 7/20* (2006.01)

(52) U.S. Cl. .................. 379/221.13; 455/461; 707/10; 707/104.1

(58) Field of Classification Search ........... 379/221.08, 379/221.09, 221.1, 221.13; 455/414.1, 461; 707/1, 10, 104.1
See application file for complete search history.

(56) References Cited

U.S. PATENT DOCUMENTS 6,006,098 A     12/1999  Rathnasabapathy et al.
6,154,534 A *   11/2000  Bredberg et al. ...... 379/221.13
6,445,785 B1*   9/2002   Chan et al. ............ 379/221.13

* cited by examiner

*Primary Examiner*—Harry S. Hong
(74) *Attorney, Agent, or Firm*—Jenkins, Wilson,Taylor & Hunt, P.A.

(57) ABSTRACT

Methods and systems for distributing and accessing large amounts of signaling message processing data in a signaling message processing node are disclosed. More particularly, a large amount of signaling message processing data, such as number portability translation data, may be segmented and distributed across multiple processing modules. For example, subscriber portability data contained in a large national local number portability (LNP) database is divided or segmented according to NPA-NXX ranges or geographic regions, and LNP data associated with each region or segment is stored on a different database service module (DSM) within the message processing system. A signaling message requiring number portability processing is received by a communication module. The communication module directs the message a DSM that contains the LNP data segment necessary to process the message.

31 Claims, 7 Drawing Sheets

METHODS AND SYSTEMS FOR
DISTRIBUTING APPLICATION DATA
AMONG MULTIPLE PROCESSING
MODULES IN A TELECOMMUNICATIONS
NETWORK ELEMENT HAVING A
DISTRIBUTED INTERNAL PROCESSING
ARCHITECTURE

TECHNICAL FIELD

The present invention relates to methods and systems for distributing a database among multiple processing modules. More particularly, the present invention relates to methods and systems for distributing a database associated with a telecommunications service among processing modules in a network element having a distributed internal processing architecture.

BACKGROUND ART

Some telecommunications network elements have distributed internal processing architectures. For example, the Eagle® signal transfer point (STP) and IP$^7$ Secure Gateway™ products available from Tekelec of Calabasas, Calif., are two examples of such distributed processing systems. FIG. 1 is block diagram, which illustrates the distributed system architecture of a Tekelec Eagle® STP 100. In FIG. 1, STP 100 includes an interprocessor message transport (IMT) communication bus 102, multiple signaling system 7 (SS7) link interface communication modules (LIMs) 104, and multiple uniformly provisioned, database service modules (DSMs) 106. In this example, DSMs 106 are provisioned to support local number portability (LNP) processing of received signaling messages. Each of the DSMs of cluster 106 is provisioned with the same LNP translation data. Received signaling messages that require LNP translation processing are load-shared among DSMs of cluster 106. As indicated in FIG. 1, each DSM of cluster 106 contains a complete copy of all LNP translation data, which is obtained from a local provisioning system that includes a local service management system (LSMS) 110 and one or more Eagle® LNP application processor (ELAP) provisioning servers 112.

In the exemplary STP architecture shown in FIG. 1, a signaling message requiring LNP translation service is received by a LIM and is distributed to an available LNP DSM of cluster 106. Such a system architecture is attractive because a minimal message processing burden is placed on the LIM communication modules, and consequently, high message throughput rates may be achieved. However, recent developments in the telecommunications industry have exposed a potential weakness or shortcoming in storing all of the LNP data in a single database. This shortcoming involves cost and processing inefficiencies that emerge when the amount of number portability data that must be stored and accessed on each DSM becomes great. For example, the time required to perform each lookup in the database increases as the size of the database increases. In addition, storing multiple copies of a large database unnecessarily wastes memory and card reload times will increase proportionally to the increase in database size.

Accordingly, there exists a need for improved methods and systems for storing and accessing large message processing data sets in a signaling message routing node.

DISCLOSURE OF INVENTION

Methods and systems for distributing and accessing large amounts of signaling message processing data in a signaling message processing node having a distributed internal processing architecture are disclosed. According to one exemplary method, a large amount of signaling message processing data, such as number portability translation data, is distributed across multiple processing modules. Such data may be segmented according to NPA-NXX ranges or geographic regions, and LNP data associated with different regions or segments may be stored on different processing modules within a signaling message routing node.

Once the data has been divided, a signaling message requiring number portability processing may be received at a signaling link interface module. The link interface module may first select the service type for the message and then select the processing module that stores the segment of data for processing the signaling message. The link interface module may then forward the signaling message to the selected processing module. Because the data for the selected service is divided among multiple processing modules, the time required to process each signaling message is reduced over conventional methods in which each processing module stores the entire set of processing data for a particular service.

Alternatively, the service type may be stored in the DSM card which may result in the message picking the wrong DSM card and result in a double hop. For example, all messages requiring LNP or other types of translations may first be routed to one of the DSM cards. Service selection may be performed on the DSM card. Once service selection is performed, the card that stores the segment of data for the DSM card may be identified. The receiving DSM card may then route the message to the appropriate DSM card within the STP.

Accordingly, it is an object of the present invention to provide methods and systems for segmenting and distributing a large database across multiple processing modules.

It is another object of the invention to provide methods and systems for directing a received signaling message to a processing module that contains the data necessary to process the message.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
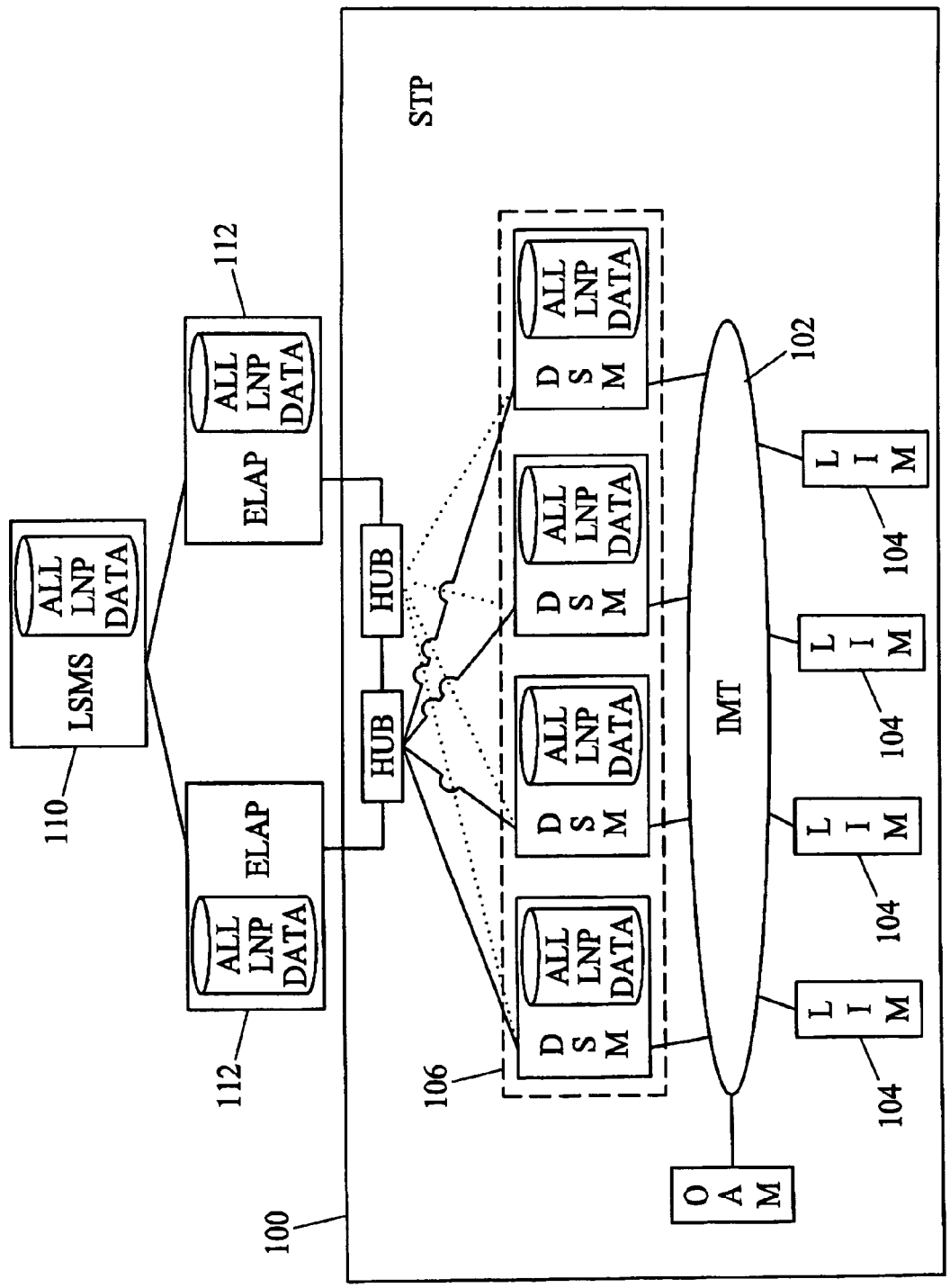
FIG. 1 is a block diagram illustrating a conventional LNP database implementation in a signal transfer point.
Figure 2:
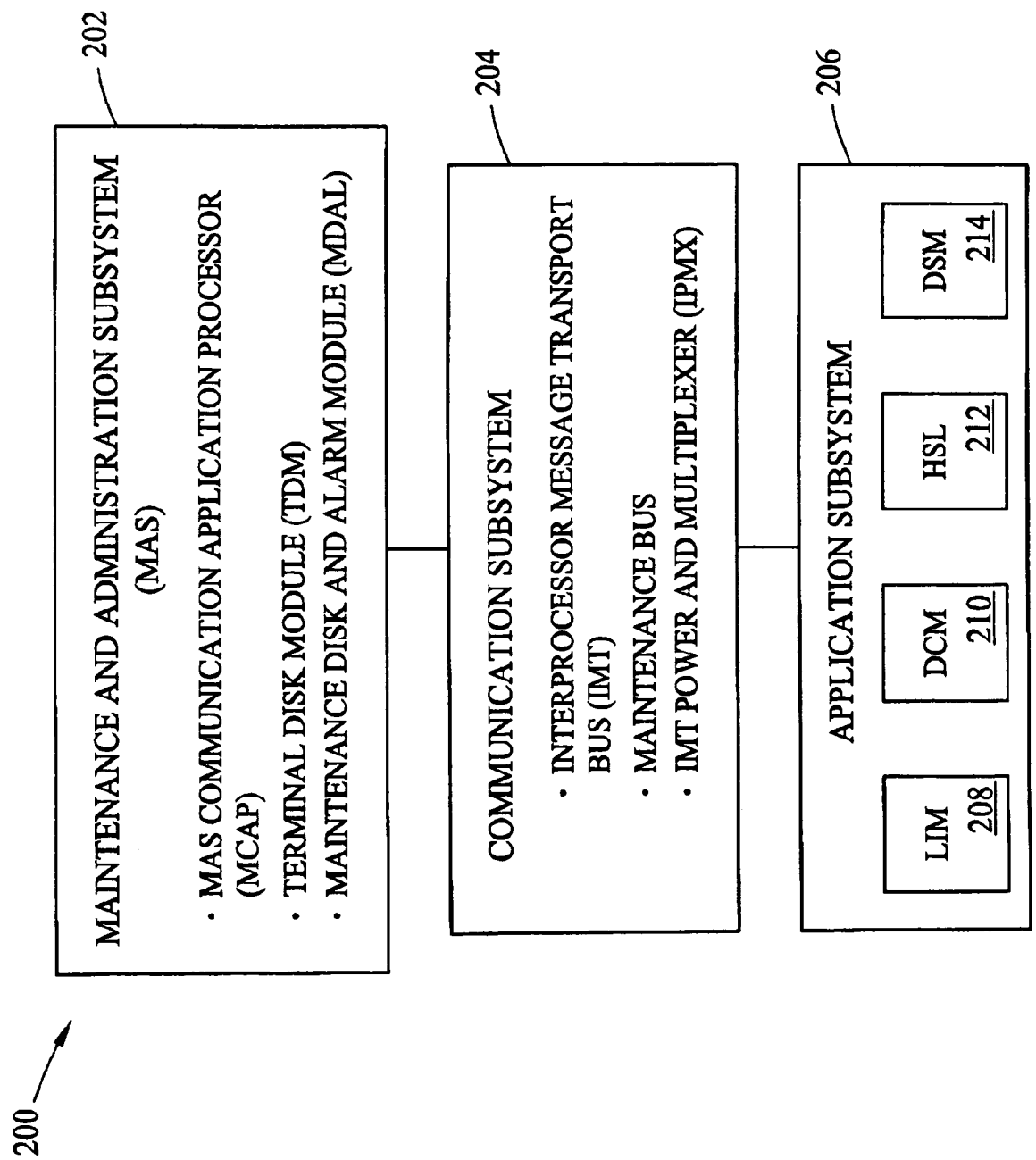
FIG. 2 is a block diagram illustrating an exemplary architecture of a signaling gateway (SG) routing node suitable for use with embodiments of the present invention.

Disclosed herein are several embodiments of the present invention, which may include an underlying hardware platform similar to that of a signal transfer point (STP) or an SS7-over-Internet protocol signaling gateway (SG). FIG. 2 is a block diagram illustrating an exemplary SG node 200, which employs a highly distributed, multi-processor system architecture suitable for use with embodiments of the present invention. As shown in FIG. 2, SG 200 includes the following subsystems: a maintenance and administration subsystem (MAS) 202, a communication subsystem 204 and an application subsystem 206. MAS 202 provides maintenance communications, initial program loading, peripheral services, alarm processing and system disks. Communication subsystem 204 includes an interprocessor message transport (IMT) bus that is the main communication bus or network in SG 200. The IMT bus facilitates communication among the various modules and subsystems in SG 200. The IMT bus may include two 1 Gbps counter-rotating serial rings.

Application subsystem 206 includes processing modules or printed circuit boards capable of communicating with the other cards through IMT bus. Numerous types of processing modules can be included in SG 200. Exemplary processing modules that may be part of application subsystem 206 include an SS7 LIM 208 that provides SS7 links and X.25 links, a data communication module (DCM) 210 that provides an Internet protocol (IP) signaling interface to external nodes, and a high-speed asynchronous transfer mode (ATM) communication link module (HSL) 212. A DSM 214 may host one or more signaling message processing applications, such as global title translation, flexible routing, number portability translation, call screening, pre-paid calling service, mobile services (e.g., home location register, short message service center, mobile authentication center, equipment identity register, location-based service), 800 number service, caller identification service, and other applications that involve routing or application layer signaling message processing.

From a hardware perspective, each processing module may include an application processor and a communications processor. The application processor may perform telecommunications signaling message processing functions, such as parsing messages and performing database lookups. The communications processor on each module may control communications with other processing modules via the IMT bus.

According to one embodiment of the present invention, multiple DSMs may be simultaneously deployed within an SG routing node, where each DSM module contains a different, smaller portion or segment of a larger database associated with a particular message processing service. One or more segmentation parameters may be used to determine how to segment a large database. For example, translation data associated a large national LNP database may be divided into multiple, smaller LNP database segments, and each database segment may be loaded onto a different DSM processing module. A subscriber address (e.g., an SCCP called party address, a mobile subscriber identifier, etc.) may be used as a segmentation parameter, such that each smaller database segment contains LNP translation data associated with a different subscriber NPA-NXX range.

Figure 3:
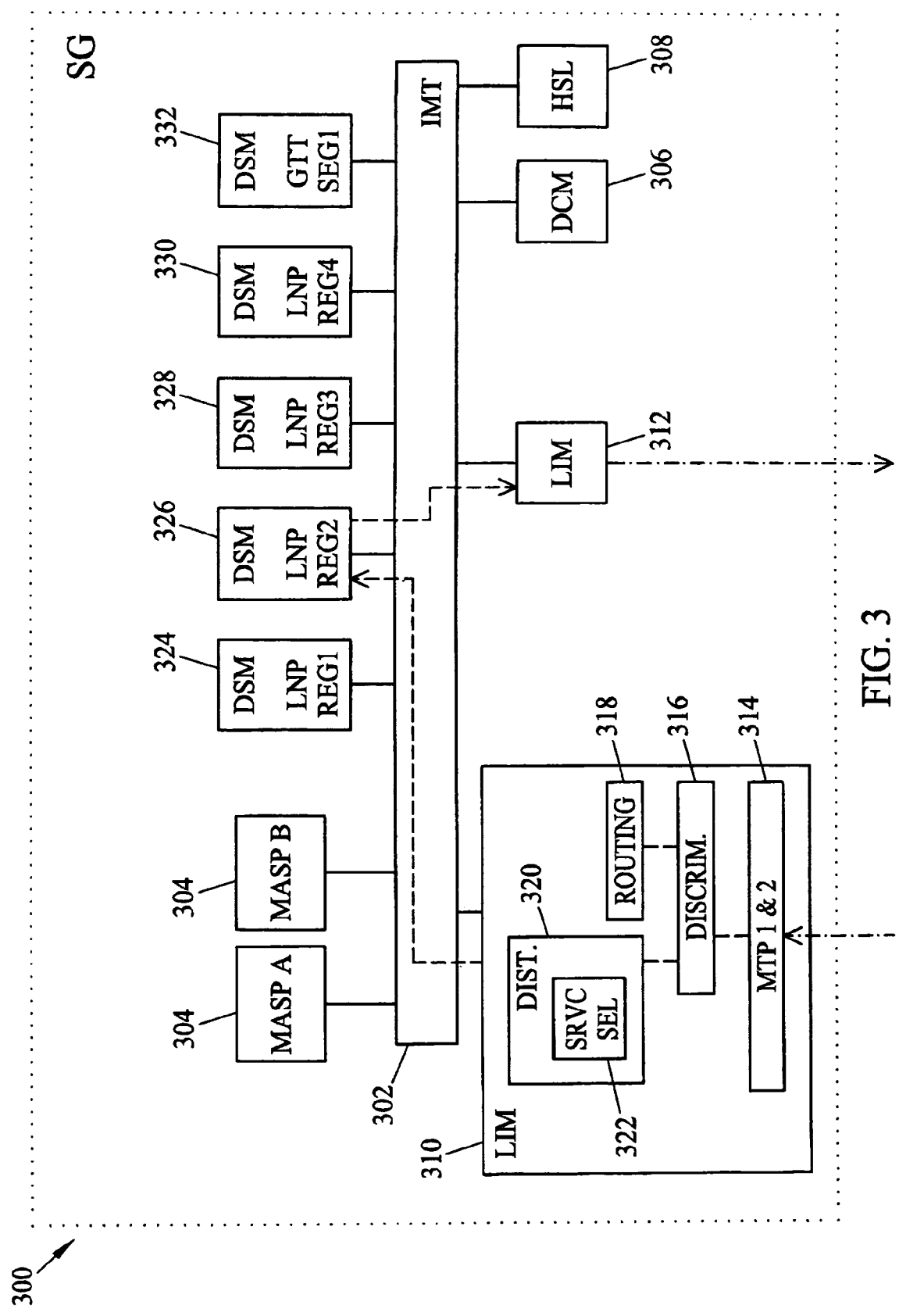
FIG. 3 is a block diagram of a routing node that includes an LNP database distributed across multiple processing modules according to an embodiment of the present invention.

FIG. 3 illustrates an SG routing node 300 having a distributed database system of the present invention. In FIG. 3, SG routing node 300 includes a high speed IMT communications bus 302 and a pair of MASP processor modules 304. MASP pair 304 implement the maintenance and administration subsystem functions described above. A number of distributed processing modules or cards may be coupled to IMT bus 302. In FIG. 3, these processing modules or cards include an IP-capable DCM 306, an ATM-capable HSL 308, and a pair of SS7 LIMs 310 and 312. Each LIM may be connected to many other signaling points in a network via one or more individual signaling links, where an SS7 signaling link is typically a 56 kbps or 64 kbps DS0 link. Multiple signaling links connected to a common destination may be grouped into a virtual entity known as an SS7 signaling linkset. An IP socket connection is used in a manner that is analogous to a signaling link.

As illustrated in FIG. 3, LIM 310 includes an SS7 MTP level 1 & 2 function 314, an SS7 MTP level 3 message discrimination function 316, a routing function 318 and a message distribution function 320. MTP level 1 and 2 function 314 provides the facilities necessary to send and receive digital data over a particular physical medium, as well as to provide error detection, error correction and sequenced delivery of SS7 messages. Message discrimination function 316 receives signaling messages from the lower processing layers and applies a discrimination function that effectively determines whether an incoming SS7 message requires internal processing or is simply to be through switched. Examples of received SS7 messages that require internal processing include SCCP messages in need of global title translation (GTT), messages requiring number portability (NP) translation service, signaling network management messages, and messages requiring other application services, as mentioned previously.

For received signaling messages that require MTP routing, routing function 318 is responsible for examining an incoming message received from discrimination function 316 and determining on which outbound linkset/link or signaling link equivalent (e.g., IP socket connection, etc.) the message is to be transmitted. Routing function 318 may also internally transmit the message to the outbound communication module (e.g., LIM, DCM, HSL) associated with the selected signaling linkset via IMT bus 302.

If discrimination function 320 determines that a received signaling message requires processing by an internal application processor or subsystem of the SG node, then the message is passed to message distribution function 320. In the embodiment illustrated in FIG. 3, message distribution function 320 includes a service selection function 322. Service selection function 322 direct the signaling message to an application processor module that is equipped to provide the appropriate message processing service. In the case where a message processing database has been segmented and distributed across multiple processor modules as illustrated in FIG. 3, service selection function 322 may direct the signaling message to not only to a DSM that supports the correct service (e.g., LNP, GTT, etc.), but also to the specific DSM that contains the segment of data necessary to process the message.

In FIG. 3, SG 300 includes a cluster of non-uniformly-provisioned DSMs that provide LNP translation service. These exemplary DSMs include DSM 324, which contains LNP translation data associated with subscribers in a first region, DSM 326, which contains LNP translation data associated with subscribers in a second region, DSM 328, which contains LNP translation data associated with subscribers in a third region, and DSM 330, which contains LNP translation data associated with subscribers in a fourth region. A subscriber identifier, such as a wireline telephone number, mobile subscriber ISDN (MSISDN) number, or international mobile station identifier (IMSI) number, may be used as the basis for segmenting a large application database (e.g., a LNP database, a mobile number portability database, a global title translation database, etc.). SG 300 may also include a DSM 332 that provides GTT service. Service selection function 322 examine parameters associated with or contained within a received signaling message in order to determine which processing service is required (i.e., LNP or GTT) and subsequently direct the signaling message to the correct DSM within the application service cluster.

The present invention does not preclude load-sharing among multiple, uniformly provisioned, processors within the same database segment cluster. For example, multiple, identically provisioned, DSMs may be configured to support the LNP region 1 data segment. As such, once service selection function 320 has determined that a received signaling message requires processing by a DSM containing LNP region 1 data, the signaling message may be directed to the first available DSM that is provisioned with LNP region 1 data. Once message processing has been completed by the selected DSM, an appropriate outbound signaling linkset or socket connection is selected by the DSM, and the processed message is directed via IMT bus 302 to a communication module (e.g., LIM, DCM, HSL) associated with the selected outbound linkset or socket connection for subsequent transmission to or towards a final network destination.

Service Selection

Service selection may be triggered after a received message passes standard message processing steps. For example, discrimination function 316 may examine a received signaling message and determine the message was received from an allowed originating node in the network. Discrimination function 316 may further examine a destination point code (DPC) parameter and a service indicator (SI) parameter in the received message and determine that the message has been assigned an SI value of 3, which indicates that the message is an SCCP message. Since SCCP messages addressed to routing node 300 require further internal processing, discrimination function 316 may pass the message to distribution function 320. Distribution function 320 may receive such messages from discrimination function 316 and pass such messages to or invoke service selection function 322.

Service selection function 322 first identifies the service type. In order to determine the service type, service selection function 322 may decode one or more message parameters. For example, service selection function 322 may decode and utilize network domain information (e.g., ANSI, ITU-International, ITU-National, etc.), a translation type (TT) indicator, a global title indicator (GTI), a mobile application part (MAP) message type operation (Op) code, a numbering plan (NP) indicator, nature of address indicator (NAI), and SCCP subsystem (SSN) indicator. Service selection function 322 may use another parameter, such as the called party address to identify the DSM containing the segment of data for processing the message within the selected service type. For ISUP IAM messages directed to former end offices of ported out subscribers, service selection function 322 may use the called party dialed digits to send the message to the processing module containing the number portability translation data so that the IAM message can be re-directed to the called party end office to which the subscriber has been ported.

Figure 4:
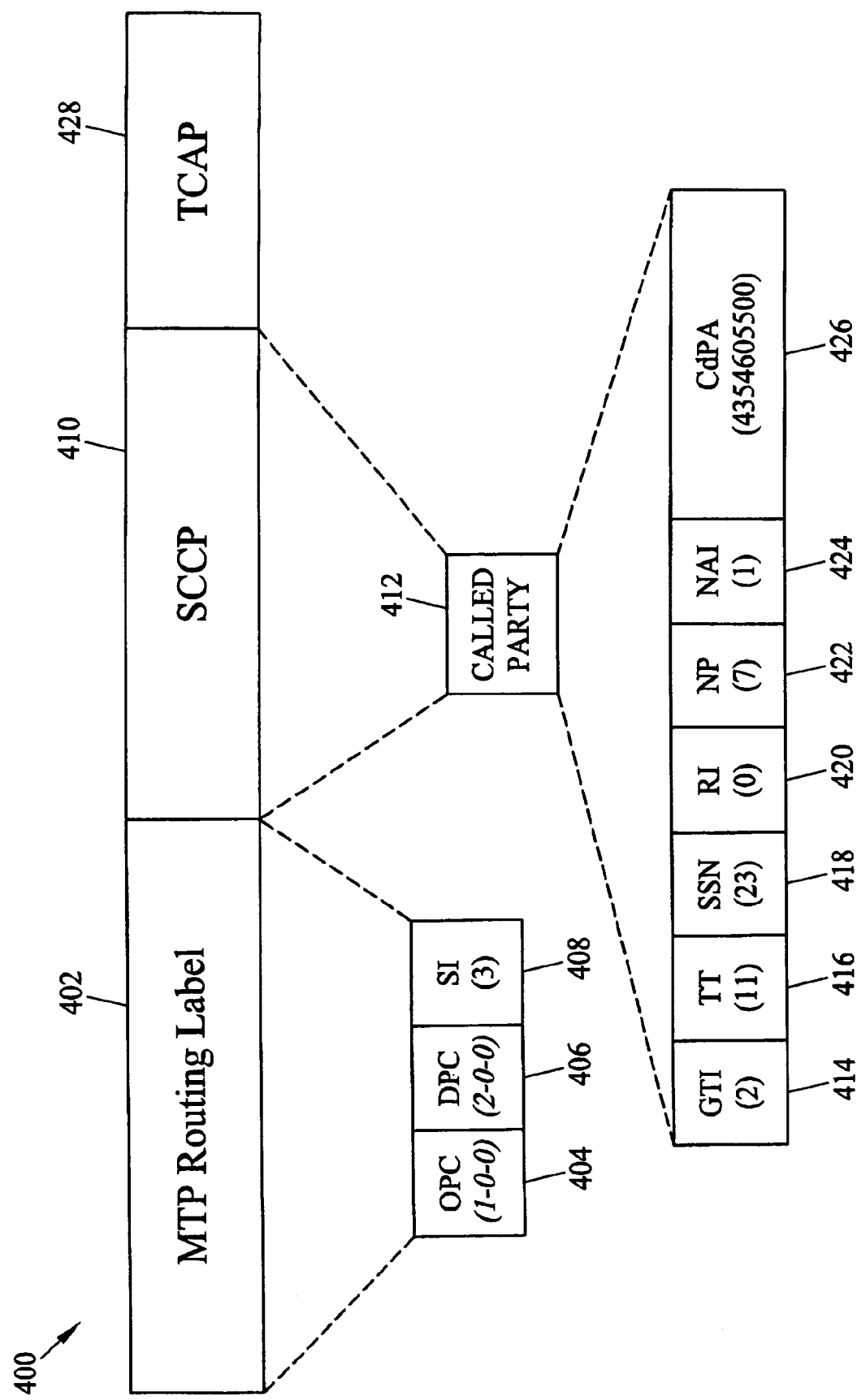
FIG. 4 is a block diagram of an SCCP signaling message.

FIG. 4 is a block diagram illustrating an exemplary SS7 SCCP signaling message illustrating some of the parameters that may be used by service selection function 322. In FIG. 4, SCCP message 400 includes a mobile application part (MAP) application layer payload. SCCP message 400 also includes an SS7 message transfer part (MTP) routing label 402, that includes an SS7 origination point code (OPC) 404, an SS7 destination point code (DPC) 406, and a service indicator (SI) 408. Message 400 further includes an SS7 SCCP component 410, which includes called party information 412. SCCP called party information may include a GTI parameter 414, a TT parameter 416, an SSN parameter 418, a routing indicator (RI) 420, an NP parameter 422, an NAI parameter 424, and called party address (CdPA) information 426. A transaction capabilities application part (TCAP) layer 428 may also be carried in SCCP message 400. The TCAP layer may include an op code parameter that identifies the message type. Additional TCAP layer parameters, including mobile subscriber identifiers, such as mobile subscriber ISDN (MSISDN) and international mobile station identifier (IMSI) parameters may also be used by service selection function 322 to select a DSM for processing a received signaling message.

Service selection may be based on any or all of the above mentioned signaling message parameters. For instance, in one embodiment of the present invention, a MAP Update Location message (Op code=2) associated with a mobile subscriber having an MSISDN of 9193457017 that is received by the SG 300 may be directed by service selection function 322 to one of many DSMs that are provisioned to support a flexible HLR routing address translation application, such as the Tekelec G-Flex® application. In such an example, the selected DSM may be one of a plurality of non-uniformly-provisioned flexible HLR routing address translation processors, which contains the range or segment of translation data that includes the MSISDN value 9193457017.

While the description above focuses primarily on the processing of SS7 SCCP signaling messages, the present invention is not limited to processing SS7 messages. For example, the present invention may include processing IP-encapsulated SS7 messages, such as Internet Engineering Task Force (IETF) SIGTRAN SCCP user adaptation (SUA) protocol messages. Such SUA messages may be received and processed via a DCM (e.g., DCM 306) in a manner similar to that described above with respect to LIM 310. In the case of SUA messages, service selection parameters similar or analogous to those described above may be used to effect service selection according to the present invention. Session initiation protocol (SIP) messages may also be processed by a distributed database system of the present invention in a similar manner. For example, a subscriber identifier contained in a "To" field of a SIP message may be used by a service selection of the present invention. Other parameters contained in a SIP message may be used in an analogous manner to those SS7 MTP, SCCP, TCAP, and MAP parameters described above during service selection processing.

Tables 1 and 2 below illustrate exemplary data structures associated with one embodiment of a service selection algorithm of the present invention. Table 1 illustrates an exemplary service selector lookup data structure, which includes a complex service selector key including network domain, GTI, TT, NP, NAI, and SSN information. Although a multi-parameter, complex selector key is illustrated in Table 1, a service selection algorithm of the present invention may include a simple lookup key that includes only a single parameter, such as TT. However, TT may be omitted as a service selection parameter without departing from the scope of the invention. In Table 1, each unique selector key value may be associated with service identifier, such as a GTT service identifier, an LNP service identifier, a mobile number portability service identifier, a CNAM service identifier, etc.

TABLE 1

Service Selection Data

| Domain | GTI | TT | NP | NAI | SSN | Service |
|---|---|---|---|---|---|---|
| ANSI | 2 | 11 | | | 23 | LNP |
| ITU | 4 | 3 | 3 | 2 | 6 | HLR |
| ITU | 4 | 4 | 3 | 2 | 14 | GTT |
| ANSI | 2 | 5 | | | 21 | CNAM |

Once service selection has been performed using the information in Table 1, service segmentation information is next examined to identify the processing module that contains the segment of data associated with the selected service for processing the received message. Table 2 shown below maps each service identifier from Table 1, along with a subscriber identifier (or range of subscriber identifiers), to a particular DSM in the SG system. In Table 2, the DSM/application identifier may be a logical identifier, a physical location identifier, such as an internal communication bus address (e.g., card slot address), an external network address identifier (e.g., SS7 network address), an Internet protocol (IP) address (e.g., local or wide area network address), a data structure pointer, or a memory address. In the sample data presented in Table 2, the DSM identifier is an IMT communication bus card slot address. Also, the sample subscriber identifier data presented in Table 2 is stored in an NPA-NXX format or could point to a regional identifier (Northeast, Southeast etc.), which in turn would point to an NPA-NXX. In practice, any number of subscriber identifying digits may be used, and the subscriber identifier data need not be stored in range format. Subscriber identifier data may be stored as individual subscriber identifiers.

TABLE 2

Service Segmentation Data

| Service Type | Subscriber ID Range | DSM Identifier |
|---|---|---|
| LNP | 000000–250000 | 2201 |
| LNP | 250001–500000 | 2202 |
| LNP | 500001–750000 | 2203 |
| LNP | 750001–999999 | 2204 |
| GTT | 000000–500000 | 2205 |
| GTT | 500001–999999 | 2206 |

Referring again to the sample signaling message presented in FIG. 4, service selection function 322 may decode and examine a number of parameters contained in message 400, including: network domain=ANSI, GTI=2, TT=11, and SSN=23. A lookup is performed using the data in Table 1, which returns a match at the first entry in the table. The matching entry indicates that the required/requested service is LNP translation service. Table 2 is next accessed using the selected service identifier (i.e., LNP) as well as information associated with or extracted from the message that corresponds to the segmentation key or parameter (i.e., the subscriber identifier in NPA-NXX format) that was used to segment the LNP database. In this example, an SCCP CdPA subscriber identifier (4354605500) is decoded from the message and used in the DSM selection operation via a lookup in Table 2. The SCCP CdPA subscriber identifier contained in the message may be used as an LNP database segment indicator. Service selection function 322 may use this indicator, once the proper service has been selected, to identify the specific LNP DSM that contains the translation data segment required to process the message.

The ranges of subscriber identifiers in Table 2 may be searched using the first 6 digits (NPA-NXX format) of the subscriber identifier (i.e., 435460) contained in a received message. In this example, a match is located at the second entry in Table 2, indicating that the LNP DSM at IMT bus address 2202 is configured to process the message. In SG 300 shown in FIG. 3, LNP DSM 326 is assigned an IMT bus address of 2202. Consequently, distribution function 320 directs the message to DSM 326 for LNP processing.

Service Selection Module

Figure 5:
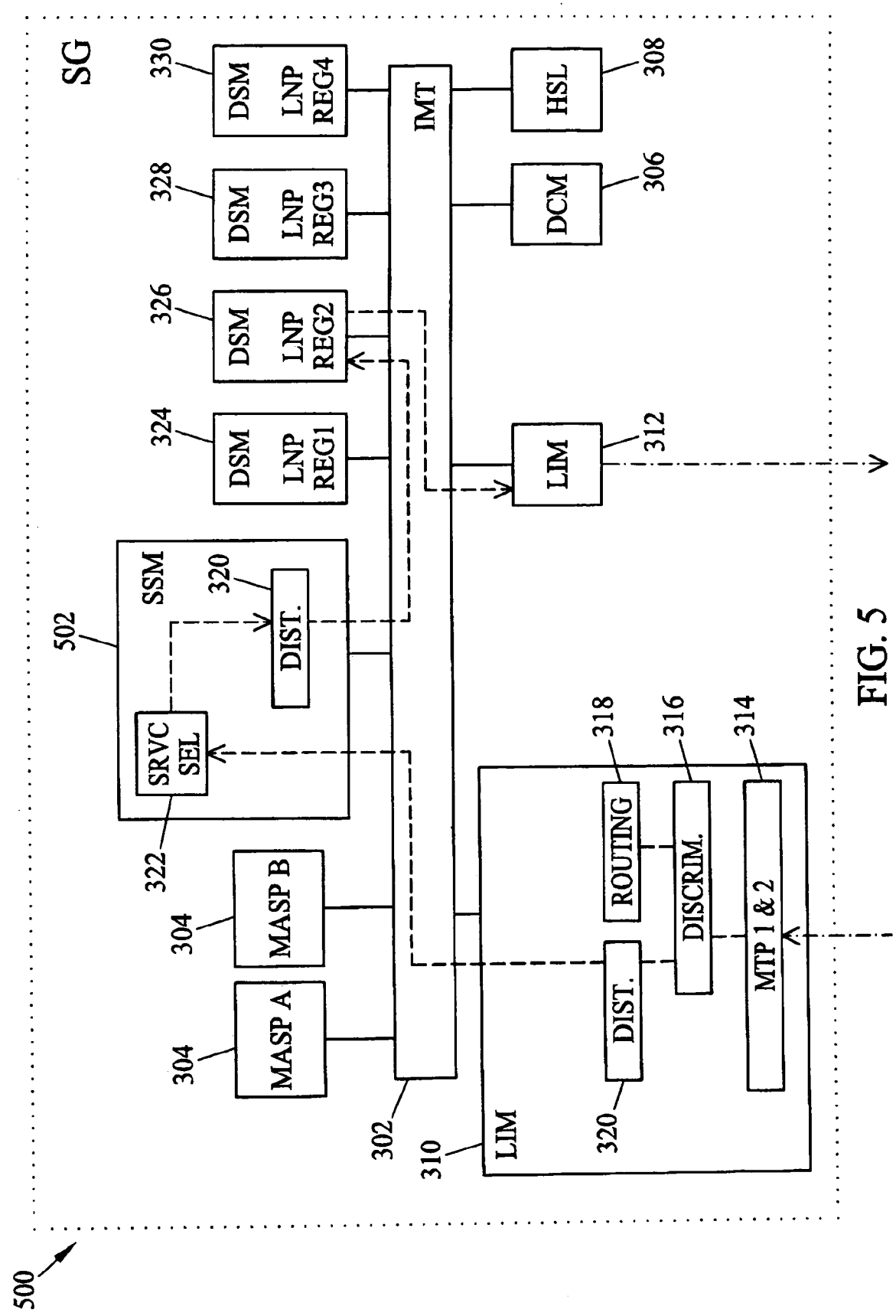
FIG. 5 is a block diagram of an alternate architecture for a signaling message routing node with a distributed internal number portability database according to an embodiment of the present invention.

The present invention is not limited to locating the service selection function on a link interface module. FIG. 5 illustrates another embodiment of an SG node 500 of the present invention, which utilizes a service selection module (SSM) 502 for receiving a message from a link interface module and directing the message to the appropriate one of many non-uniformly-provisioned DSMs associated with a message processing service. SSM 502 includes a service selection function 322 as described above with respect to FIG. 3. SSM module 502 also includes a message distribution function 320 for directing a message via IMT bus 302 to a DSM processor module. As will be described below with regard to FIG. 6, the service selection function may alternatively be incorporated directly on the DSM to avoid any potential bottlenecks in throughput.

In the implementation illustrated in FIG. 5, LIM 310 may receive a signaling message, such as SCCP message 400 from FIG. 4, and determine that the message may require processing by an application associated with SG 500. For example, such a determination may be made at LIM 310 when a message has an SI parameter value of 3 and is addressed to the point code of routing node 500. In such a case, LIM 310 may distribute the signaling message to SSM module 502. The message is received by SSM 502, and service selection function 322 may examine various parameters contained in the message and, using information similar to that presented in Table 1 above, determine that processing of the message by an LNP translation application is required.

In a manner similar to that described above with regard to FIG. 3, the selected service identifier (e.g., LNP) is used to select the appropriate one of four LNP DSM processors (i.e., DSM 324, DSM 326, DSM 328, DSM 330), which contains the specific LNP translation data required to process the signaling message.

Referring again to the signaling message illustrated in FIG. 4, service selection function 322 may decode and examine a number of parameters contained in message 400, including: network domain=ANSI, GTI=2, TT=11, and SSN=23. A lookup is performed using the data in Table 1, which returns a match at the first entry in the table. The matching entry indicates that the requested service is LNP translation service. Table 2 is next accessed, using the selected service identifier (i.e., the LNP service identifier) and an SCCP CdPA subscriber identifier (4354605500) decoded from the message. The subscriber range data in Table 2 is searched using the first 6 digits (NPA-NXX) of the subscriber identifier (i.e., 435460). A match is located at the second entry in Table 2, indicating that the LNP DSM application processor at IMT bus address 2202 is configured to process the message. In SG 500, shown in FIG. 5, LNP DSM module 326 is assigned an IMT bus address of 2202. Consequently, distribution function 506 directs the message to DSM 326 for LNP processing.

Figure 6:
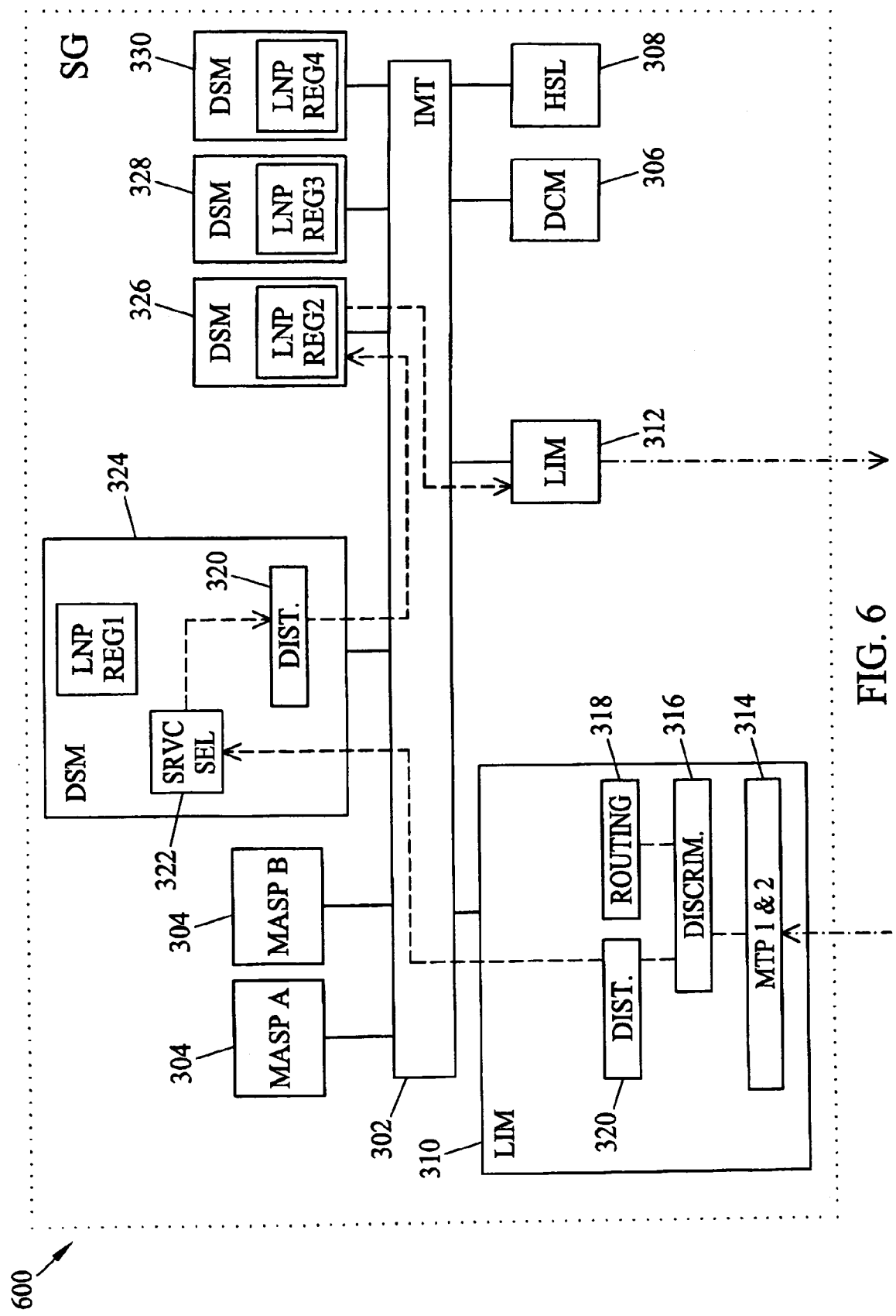
FIG. 6 is a block diagram of a signaling message routing node in which service selection is performed on a DSM card according to an embodiment of the present invention.

FIG. 6 is a block diagram of a signaling gateway 600 in which service selection function 322 is located on one of the DSM cards according to an embodiment of the present invention. Such an embodiment may be useful in situations where throughput on the LIMs is of concern. Referring to FIG. 6, service selection function 322 is located on DSM card 324, which contains the LNP data for region 1. Service selection function 322 may function as described above to select the service type (if services other than LNP are provided) and to select the DSM that contains the segment of data within the selected service type.

In operation, the LIMs in signaling gateway 600 may initially direct all SCCP messages that are addressed to the point code of signaling gateway 600 to DSM 324, which contains LNP data for region 1. Service selection function 322 on DSM 324 determines whether the LNP translation can be performed using region 1 LNP data. If the translation cannot be performed using LNP region 1 data, service selection function 322 identifies the DSM containing the appropriate LNP data, and distribution function on DSM 324 distributes the message to the identified DSM. Thus, in the embodiment illustrated in FIG. 6, two hops may be required to reach the appropriate segment of the LNP database. However, the processing burden on the LIMs is reduced. Moreover, unlike the embodiment illustrated in FIG. 5, additional hardware is not required when the service selection function is placed on one of the DSM cards.

Figure 7:
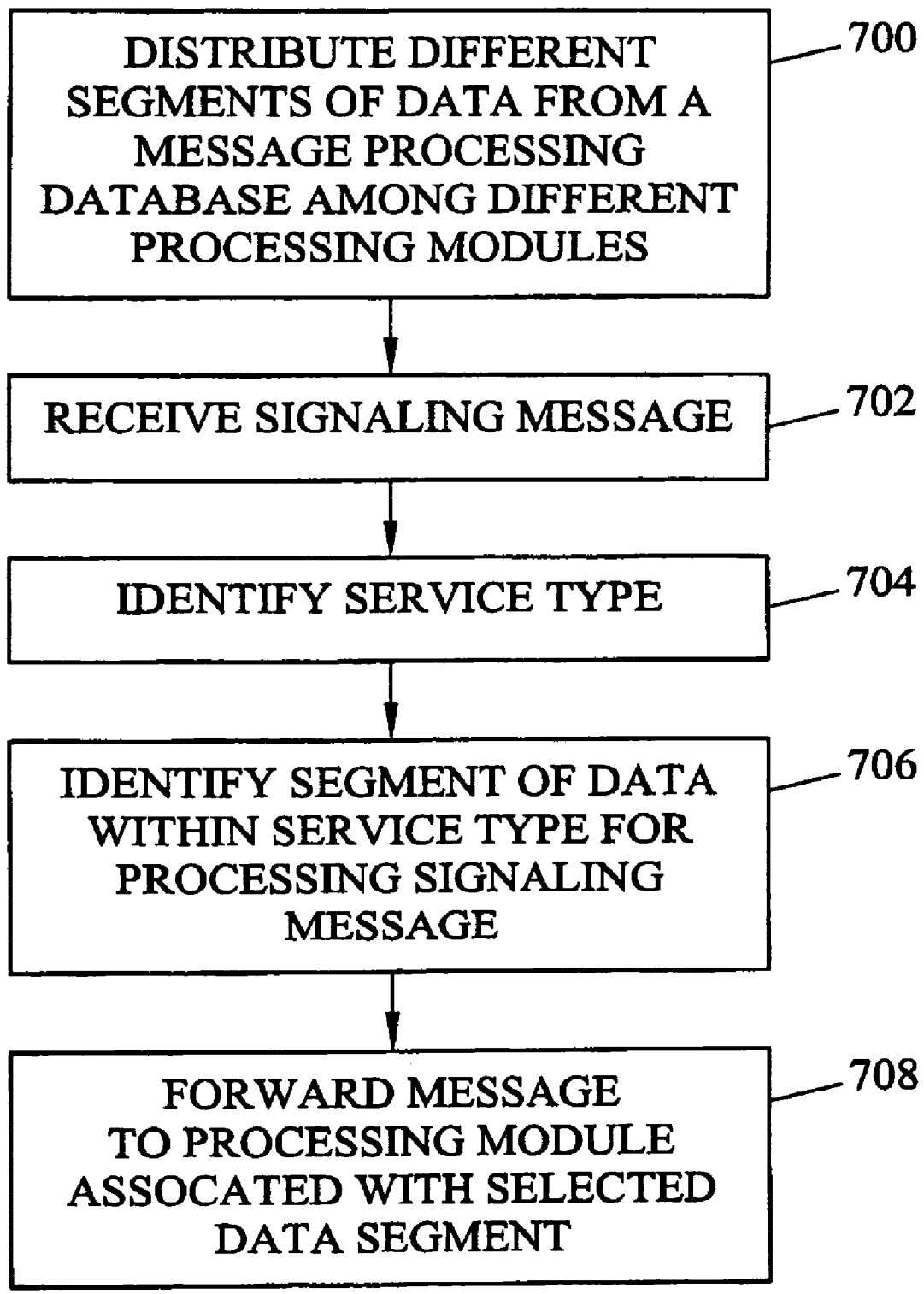
FIG. 7 is a flow chart illustrating exemplary steps that may be performed in processing messages using a signaling message processing database distributed across multiple processing modules according to an embodiment of the present invention.

FIG. 7 is a flow chart summarizing exemplary steps that may be performed in segmenting a signaling message processing database and in processing messages using a segmented database according to an embodiment of the present invention. Referring to FIG. 6, in step 700, different segments of data from a message processing database are distributed among different processing modules. This step may be performed at provisioning time. In one example, different segments of LNP data may be distributed among different database service modules in a signal transfer point, as discussed above.

After the database has been segmented, in step 702, a signaling message is received. In step 704, the service type is identified for the signaling message. Examples of service types include local number portability service, global title translation service, calling name service, etc. Step 704 may be omitted when the only database service provided by the routing node is LNP.

In step 706, a segment of data associated with the service type for processing the signaling message is identified. This step may include extracting a parameter from the signaling message and identifying the corresponding segment of data. In step 708, the message is forwarded to the processing module associated with the selected data segment.

By using a service selection algorithm of the present invention, received messages that are identified as requiring LNP translation processing are not necessarily directed to the same LNP DSM application processor or arbitrarily load-shared among all LNP DSM processors in the SG system. Instead, a service selection algorithm of the present invention may additionally examine subscriber identifier information contained in a received signaling message and use this information to determine to which of many non-uniformly-provisioned LNP DSMs the received message should be directed for LNP translation processing. Through the implementation of the present invention, signaling message processing applications, such as LNP, which involve very large amounts of translation data, may be broken up or segmented into many smaller, more manageable databases. These non-uniform database segments may then be distributed over a plurality of processing modules within a processing system, such as an SG node, for increased processing efficiency.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for storing and accessing an application database, the method comprising:
   in a signaling message routing node having a distributed internal processing architecture:
   (a) dividing a database associated with a single telecommunications application into a plurality of different database segments;
   (b) storing the database segments on a plurality of different processing modules located within the routing node;
   (c) receiving a signaling message at a link interface module;
   (d) identifying a segment of the database associated with the telecommunications application for processing the signaling message; and
   (e) forwarding the signaling message to the processing module containing the segment of the database for processing the signaling message.

2. The method of claim 1 wherein dividing a database includes dividing a number portability database.

3. The method of claim 2 wherein dividing a number portability database includes dividing the number portability database based geographic locations of ported subscribers.

4. The method of claim 1 wherein dividing a database includes dividing a global title translation database.

5. The method of claim 4 wherein dividing a global title translation database includes dividing the global title translation database based on ranges of subscriber identifiers.

6. The method of claim 1 wherein dividing a database includes dividing an IP telephony subscriber location database.

7. The method of claim 6 wherein dividing an IP telephony subscriber location database includes dividing the IP telephony subscriber location database based IP telephony subscriber identifiers.

8. The method of claim 1 wherein dividing a database includes dividing the database based on network service provider identifiers.

9. The method of claim 1 wherein dividing a database includes dividing an equipment identity register (EIR) database.

10. The method of claim 1 wherein receiving and forwarding a signaling message includes receiving and forwarding an SS7 signaling message.

11. The method of claim 1 wherein receiving and forwarding a signaling message includes receiving and forwarding an IP telephony signaling message.

12. A method for processing signaling messages, the method comprising:

in a signaling message routing node having a distributed internal processing architecture:

(a) receiving a signaling message that requires processing by a telephony application;

(b) selecting a processing module from a plurality of processing modules located within the routing node that contains a segment of data associated with the telephony application, wherein each processing module includes a different segment of data from a database associated with the telephony application; and (c) forwarding the message to the selected processing module.

13. The method of claim 12 wherein receiving a signaling message includes receiving an SS7 signaling message.

14. The method of claim 12 wherein receiving a signaling message includes receiving an IP telephony signaling message.

15. The method of claim 12 wherein the telephony application comprises a number portability translation application.

16. The method of claim 15 wherein selecting a processing module comprises selecting a processing module containing the segment of number portability translation data for processing the signaling message.

17. The method of claim 16 wherein the number portability translation data is divided among the segments according to geographic locations of ported subscribers.

18. The method of claim 12 wherein the telephony application comprises a global title translation application.

19. The method of claim 18 wherein selecting a processing module comprises selecting a processing module containing the segment of global title translation data for processing the signaling message.

20. The method of claim 12 wherein the telephony application comprises an equipment identity register (EIR) application.

21. The method of claim 20 wherein selecting a processing module comprises selecting a processing module containing the segment of EIR data for processing the signaling message.

22. A signaling message routing node including a distributed internal processing architecture for processing signaling messages, the signaling message routing node comprising:

(a) a link interface module for sending and receiving signaling messages to and from external signaling links, at least some of the signaling messages requiring LNP translation service;

(b) a plurality of processing modules operatively associated with the link interface module and being located within the routing node for storing different portions of number portability translation data for performing number portability translations for received signaling messages; and (c) a service selection function operatively associated with the link interface module and the processing modules for selecting a processing module from the plurality of processing modules for processing each signaling message requiring number portability translation service and for forwarding the signaling messages to the selected processing modules.

23. The signaling message routing node of claim 22 wherein the link interface module comprises an SS7 link interface module.

24. The signaling message routing node of claim 22 wherein the link interface module comprises an IP link interface module.

25. The signaling message routing node of claim 22 wherein the service selection function is located on the link interface module.

26. The signaling message routing node of claim 22 wherein the service selection function is located on a first processing module of the plurality of processing modules, wherein the link interface module is adapted to forward the signaling messages requiring number portability translation service to the first processing module and wherein the service selection function is adapted to forward each signaling message to the processing module containing the set of number portability processing data for processing that signaling message.

27. The signaling message routing node of claim 22 comprising a service selection module separate from the link interface module and the processing modules, wherein the service selection function is located on the service selection module.

28. The signaling message routing node of claim 22 wherein number portability translation data is divided among the processing modules based on geographic locations of ported subscribers.

29. The signaling message routing node of claim 22 wherein the number portability translation data includes local number portability translation data.

30. The signaling message routing node of claim 22 wherein the number portability translation data includes mobile number portability translation data.

31. The signaling message routing node of claim 22 wherein the number portability translation data includes local and mobile number portability translation data.

* * * * *